United States Patent [19]

Tokunaga et al.

[11] Patent Number: 5,046,136
[45] Date of Patent: Sep. 3, 1991

[54] RADIO COMMUNICATION APPARATUS INCLUDING POWER SUPPLY DEVICE

[75] Inventors: Tadatsugu Tokunaga; Kazuo Tomimura, both of Tokyo, Japan

[73] Assignee: NEC Corporation, Japan

[21] Appl. No.: 590,588

[22] Filed: Sep. 26, 1990

Related U.S. Application Data

[63] Continuation of Ser. No. 181,731, Apr. 14, 1988, abandoned.

[30] Foreign Application Priority Data

Apr. 15, 1987 [JP] Japan ............................ 62-59903[U]

[51] Int. Cl.⁵ .............................................. H04B 1/16
[52] U.S. Cl. ...................................... 455/343; 455/67; 455/127
[58] Field of Search .................... 455/343, 127, 67, 9; 340/636

[56] References Cited

U.S. PATENT DOCUMENTS 4,471,492 9/1984 Mann et al. .......................... 455/343
4,726,020 2/1988 Fino et al. ............................ 455/127
4,755,816 7/1988 DeLuca ................................ 455/343
4,761,824 8/1988 Saito .................................... 455/127
4,809,315 2/1989 Oda ..................................... 455/127

Primary Examiner—Douglas W. Olms
Assistant Examiner—Ralph Smith
Attorney, Agent, or Firm—Ostrolenk, Faber, Gerb & Soffen

[57] ABSTRACT

A radio communication apparatus includes a power supply device which includes a solar battery connected to each of a plurality of communication channels via respective switches. A controller constantly monitors the voltage of the solar battery to turn on or off the switches stepwise, so that the number of active channels is reduced stepwise with the decrease in the capacity of the solar battery. The rate of decrease in the capacity of the solar battery is reduced to shorten the period of time during which communication is prevented, whereby operation is insured over a long period of time. Further, communication, (i.e., power consumption) is averaged to reduce the required capacity of the solar battery.

4 Claims, 2 Drawing Sheets

RADIO COMMUNICATION APPARATUS INCLUDING POWER SUPPLY DEVICE

This is a continuation of application Ser. No. 181,731 filed on Apr. 14, 1988, now abandoned.

BACKGROUND OF THE INVENTION

The present invention relates to a radio communication apparatus including a power supply device of the type using a solar battery and, more particularly, to a power supply device capable of operating over a long period of time with a relatively small capacity.

In a radio communication system such as a single-channel-Per-carrier (SCPC) communication system, a radio communication apparatus whose capacity is relatively small is implemented with a power supply device of the type using a solar battery for ease of maintenance. It has been customary to construct a solar battery-type power supply device such that the voltage of a solar battery is monitored and, when it is lowered to a predetermined level, the power supply is interrupted so as to protect the battery and insure its long service life. Further, it is a common practice to use a solar battery having a capacity which is ten times greater than the maximum capacity used, providing for nighttime and rainy weather. A drawback with such a prior art device is that upon the drop of voltage beyond the predetermined level all the communications are shut off, although the solar battery may be protected. In addition, the capacity which is approximately ten times greater than the maximum capacity used as stated above is undesirable from the cost standpoint.

SUMMARY OF THE INVENTION

It is therefore an object of the present invention to provide a radio communication apparatus including a power supply device using a solar battery in which the solar battery is capable of operating over a long period of time with a relatively small capacity.

It is another object of the present invention to provide a generally-improved radio communication apparatus including a power supply device.

A power supply device for a radio communication apparatus of the present invention comprises switches each of which are associated with a respective one of a plurality of communication channels for selectively feeding power from a solar battery to the device, and a controller for turning on or off the switches stepwise by detecting a voltage of the solar battery.

BRIEF DESCRIPTION OF THE DRAWINGS

The above and other objects, features and advantages of the present invention will become more apparent from the following detailed description taken with the accompanying drawings, in which.

DESCRIPTION OF THE PREFERRED EMBODIMENT

Figure 1:
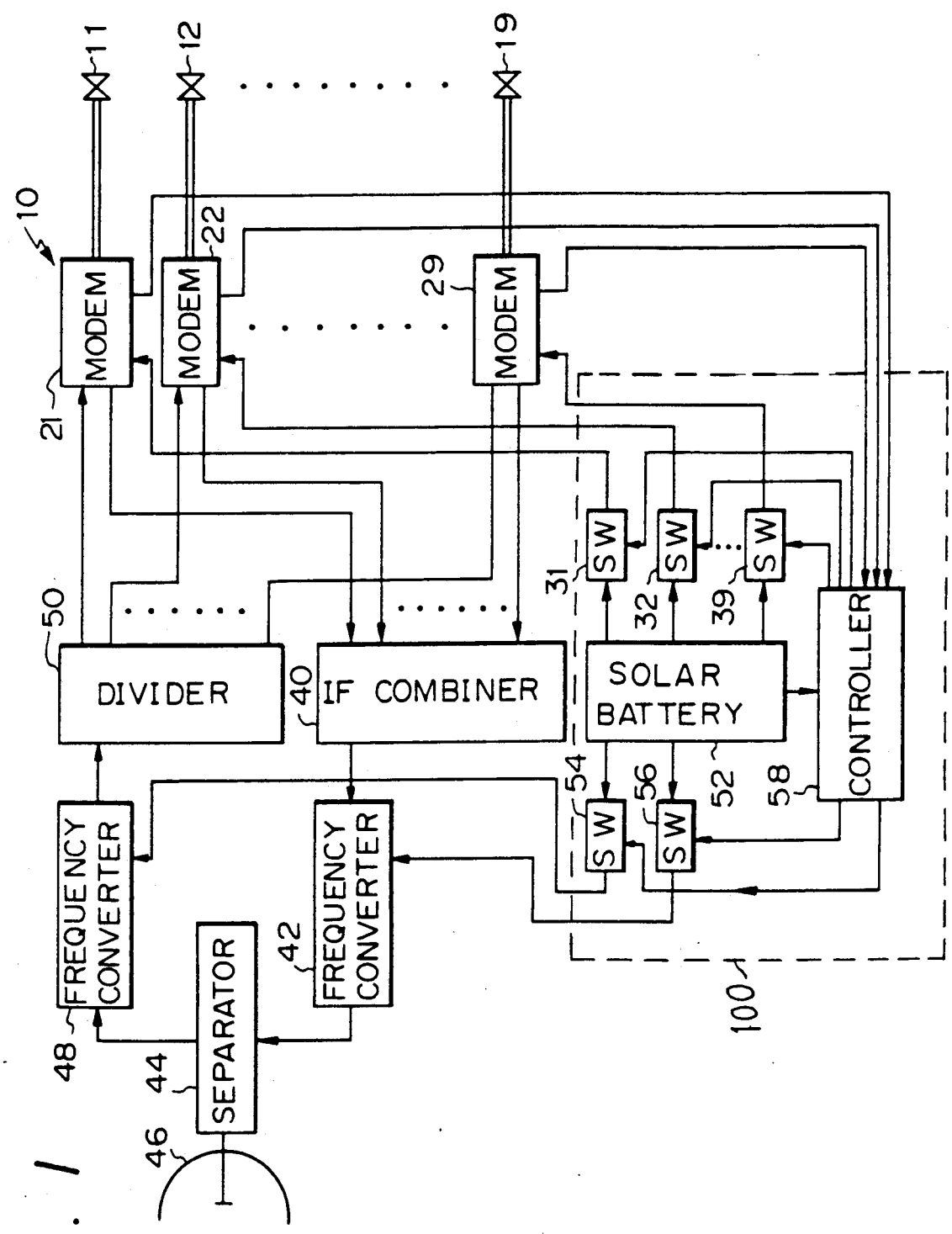
FIG. 1 is a schematic block diagram showing a radio communication apparatus including a power supply device in accordance with the present invention.

Referring to FIG. 1, a radio communication apparatus including a power supply device according to the present invention is shown and generally designated by the reference numeral 10. In the illustrative embodiment, the apparatus 10 is a 9-channel SCPC radio communication apparatus by way of example. As shown, nine terminals 11 to 19 such as telephones and facsimile transceivers are individually connected to the apparatus 10 by independent channels. The apparatus 10 comprises MODEMs 21 to 29, an intermediate frequency (IF) combiner 40, frequency converters 42 and 48, a separator 44, an antenna 46, a divider 50 and a power supply device 100. The power supply device 100 further comprises switches 31 to 39, 54 and 56, a solar battery 52 and a controller 58. Each of the MODEMs 21 to 29 is associated with a respective one of the nine channels. The switches 31 to 39 selectively feed power to the MODEMs 21 to 29. The IF combiner 40 combines modulated carrier waves at the IF stage while the frequency converter 42 serves to raise intermediate frequency to radio frequency. The separator 44 is connected to an antenna 46. The frequency converter 48 is adapted to convert radio frequency to intermediate frequency, and the divider 50 is adapted to divide an IF signal. The switches 54 and 56 are operable to establish and interrupt power supply to the frequency converters 48 and 42, respectively. The controller 58 turns on and off the switches 31 to 39 based on the voltage of the solar battery 52 which it constantly monitors. Also, the controller 58 controls the switches 54 and 56.

The operation of the radio communication apparatus 10 will be described by following the flow of signals. Assume that on one particular channel, e.g., the channel associated with a telephone 11, a voice signal is modulated by a modulator section of the MODEM 21 to become an IF signal. Applied to the IF combiner 40, the IF signal is combined with other modulated carrier waves into a single IF signal. This composite IF signal is converted by the frequency converter 42 to have a frequency which lies in a radio frequency (RF) band, the resulting signal being transmitted to another apparatus or station by radio via the separator 44 and antenna 46. On the other hand, an answer from another apparatus or station comes in through the antenna 46 in the RF band and is then routed through the separator 44 to the frequency converter 48. The output of the frequency converter 48 is divided by the divider 50, then demodulated by a demodulator section of the MODEM 21, and then fed to the telephone 11 as a voice signal.

How the power supply to various active portions in communication apparatus is controlled will be described with reference made to FIG. 2 also. Power generated by the solar battery 52 is fed to various active portions via the switches 31 to 39, 54 and 56. Voltage of the solar battery 52 is constantly monitored by the controller 58. When the voltage of the solar battery 52 is lowered to a predetermined level such as $V_2$, the controller 58 maintains active only four of the nine channels which have been supplied with power. For example, the controller 58 turns off the switches 35 to 39 which are respectively associated with the fifth to ninth channels, while holding the first to fourth channels active. In practice, power supply to those channels which are not being occupied for communication is interrupted for user's convenience. Specifically, a voice detector is installed in each of the MODEMs 21 to 29 to determine whether or not its associated channel is busy, and the controller 58 totally decides the instantaneous condition based on the outputs of the voice detectors so as to deactivate those channels which are not busy. An arrangement may be made such that when the number of busy channels is greater than that of channels to be deactivated, the busy channels are deactivated according to a predetermined priority order.

When the voltage of the solar battery 52 is further lowered to, for example, a level $V_1$ which is lower than the level $V_2$, the switches 32 to 39 are turned off so that the first channel alone is maintained active. As the voltage is lowered beyond the level $V_1$ to, for example, a level $V_0$, all the switches 31 to 39, 54 and 56 are turned off resulting in all the channels being deactivated.

Figure 2:
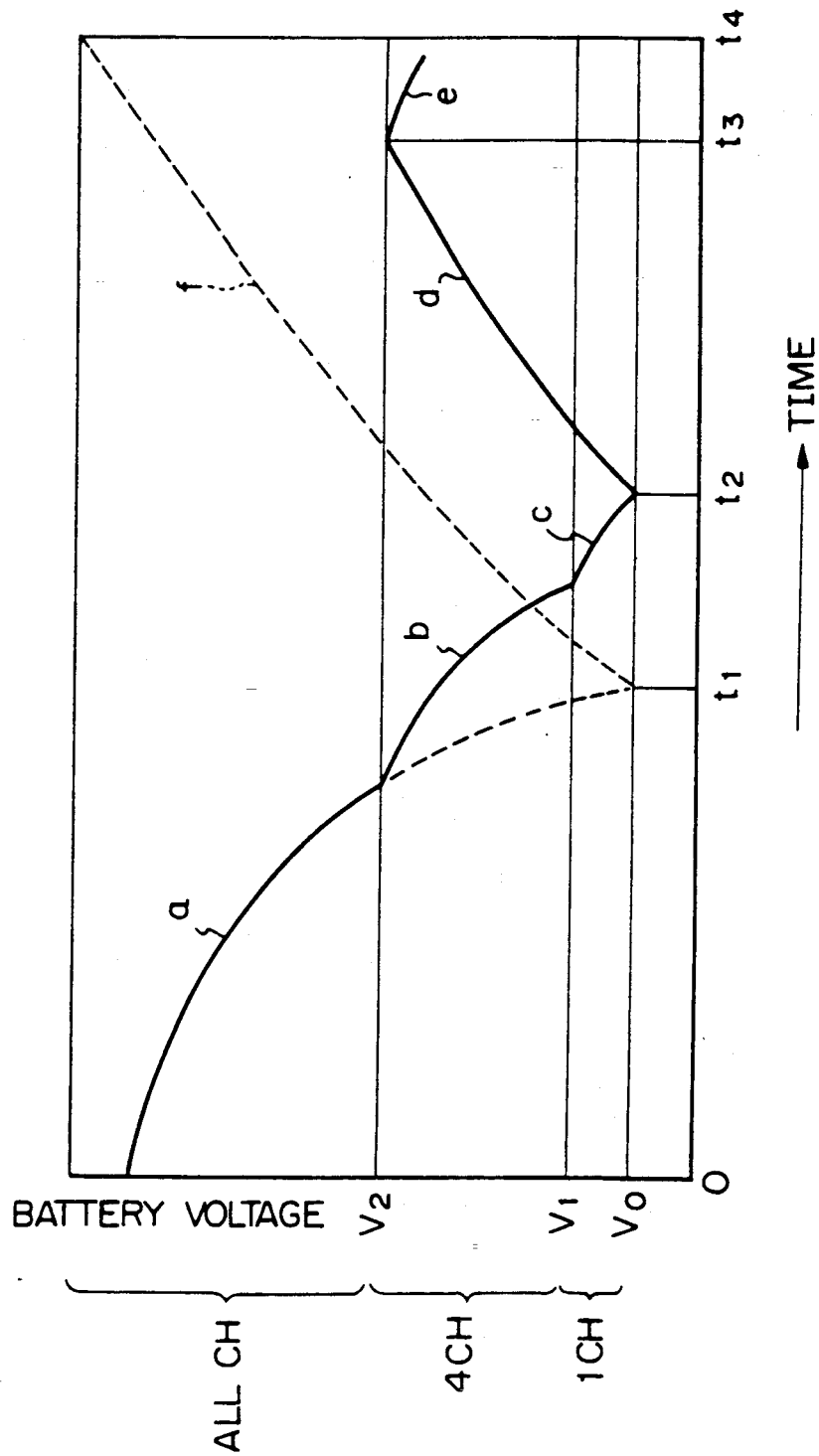
FIG. 2 is a plot representative of qualitative charging and discharging characteristics of a solar battery.

In FIG. 2, a curve a shows that voltage is fed to all the active circuits so long as the battery voltage remains higher than $V_2$. Should such minute threshold voltages $V_2$ and $V_1$ be absent, the power supply would be entirely interrupted at a time $t_1$ as indicated by a dashed line in the figure. In device 10 of the present invention, when the voltage is lowered to $V_2$, power otherwise consumed by five channels is saved so that the rate of voltage drop is reduced as represented by a solid curve b. Upon the drop of the voltage to $V_1$, power is fed to one channel only with the result that the rate of voltage drop is further reduced as indicated by a solid curve c. Consequently, the power supply is fully interrupted at a time $t_2$. Such a sequentially-decreasing rate of voltage drop is successful in extending the time at which the last channels become deactive, although all the channels will eventually become unusable. The fact that at least one channel is available for communication means the extension of service time. Further, although the number of active channels may be limited as stated above, subscribers can hold communications except when those channels are busy, on condition that the MODEMs are under demand assignment multiple access (DAMA). If desired, the apparatus 10 may be used in such a manner as to secure the last channel for emergency communication.

As the voltage of the solar battery 52 is lowered to $V_0$ and therefore power is not consumed any longer, the battery 52 begins to be charged at a time $t_2$ which is later than the time $t_1$, as indicated by a solid curve d. At a time $t_3$ when the previously stated threshold voltage ($V_2$ in the example of FIG. 2) is reached, power supply to the communication equipment is resumed. In contrast, a prior art power supply device starts charging a battery at the time $t_1$ and sequentially charges it as represented by a dashed curve f and, therefore, it is not until a time $t_4$ at which the battery is sufficiently charged that power is fed to communication equipment. Of course, the inclination or curvature of the curve f is the same as that of the curve d. It follows that the reactivation time $t_3$ attainable with the device 10 of the present invention is earlier than the reactivation time $t_4$ of the prior art device.

The curves shown in FIG. 2 have been discussed simply by neglecting the amount of charge which is stored in the solar battery 52 at the time of supplying power to the equipment. This offers no problem so far as the qualitative aspect is concerned. Hence, the device 100 reduces the period of time during which the power supply to the equipment should be interrupted for charging the solar battery 52. Moreover, the communication is averaged due to the threshold levels $V_2$ and $V_1$ which are adapted to limit the number of active channels and to lower the voltages for deciding charged conditions. Such averaged communication allows the capacity of the solar battery 52 to be reduced. For example, assume that the MODEMs 21 to 29 and frequency converters 42 and 48 shown in FIG. 1 consume power of 1 W each, i.e., the total power consumption of 11 W. Then, the prior art device would need a solar battery whose capacity is 110 W which is ten times greater than 11 W. On the other hand, since the number of channels used for communication is averaged to, for example, four in accordance with this embodiment, the solar battery 52 needs only to have a capacity of $(4+2)\times 10 = 60$ W even with a ten times greater margin included. Although the wattage of 60 W is smaller than the previously mentioned 110 W, it is of course sufficiently greater than the maximum value of 11 W necessary for using all the channels and therefore brings about no problem.

In summary, it will be seen that the present invention provides a radio communication apparatus including a power supply device which reduces the rate of decrease in the capacity of a solar battery, shortens the period of time during which communication is prevented to thereby insure operation over a long period of time, and averages communication, i.e., power consumption, to reduce the required capacity of a solar battery.

Various communications will become possible for those skilled in the art after receiving the teachings of the present disclosure without departing from the scope of the invention as set forth in the appended claims.

What is claimed is:

1. A radio communication apparatus including a power supply device, comprising:
   a plurality of switch means each being associated with a respective one of a plurality of communication channels for selectively feeding power from a solar battery to portions of said apparatus;
   means for detecting voltage levels of the solar battery; and
   control means for turning on or off said switch means in a stepwise manner upon detection of respective predetermined voltage levels of said solar battery by said detecting means and on the basis of a predetermined priority order assigned to said communication channels.

2. A radio communication apparatus as claimed in claim 1, wherein said control means is constructed to establish a plurality of threshold voltages beforehand and, when the voltage of the solar battery has reached any of said threshold voltages, turns on or off any of said switch means which are associated with predetermined ones of said communication channels.

3. A radio communication apparatus as claimed in claim 1, further comprising busy-channel-detection means to determine whether the respective communication channels are being used; and wherein said control means is constructed to establish a plurality of threshold voltages beforehand and, when the voltage of the solar battery has reached any of said threshold values, said control means, in response to said busy-channel-detection means, turns on or off those of said switch means which are associated with channels that are not being used for communication at the time of control of said switch means.

4. A radio communication apparatus as claimed in claim 1, wherein the apparatus comprises a single channel per carrier radio communication apparatus.

* * * * *